US011054656B2

(12) United States Patent
Haseltine et al.

(10) Patent No.: US 11,054,656 B2
(45) Date of Patent: Jul. 6, 2021

(54) AUTO-STEREO IMAGING FOR VIEWING IN A VEHICLE

(71) Applicant: Disney Enterprises, Inc., Burbank, CA (US)

(72) Inventors: Eric C. Haseltine, Silver Spring, MD (US); Jonathan Rd Hsu, Pomona, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/043,606

(22) Filed: Jul. 24, 2018

(65) Prior Publication Data

US 2020/0033610 A1  Jan. 30, 2020

(51) Int. Cl.
*G09G 5/00* (2006.01)
*G02B 27/01* (2006.01)
*B60K 35/00* (2006.01)
*G06T 19/00* (2011.01)
*G06K 9/00* (2006.01)

(52) U.S. Cl.
CPC .......... *G02B 27/0179* (2013.01); *B60K 35/00* (2013.01); *G06K 9/00597* (2013.01); *G06K 9/00671* (2013.01); *G06K 9/00845* (2013.01); *G06T 19/006* (2013.01); *B60K 2370/146* (2019.05); *B60K 2370/334* (2019.05); *B60K 2370/736* (2019.05); *G02B 2027/0134* (2013.01); *G02B 2027/0181* (2013.01); *G02B 2027/0187* (2013.01)

(58) Field of Classification Search
None
See application file for complete search history.

(56) References Cited

U.S. PATENT DOCUMENTS

| 4,185,178 | A | * | 1/1980 | Drees | H01H 9/287 200/333 |
| 8,692,738 | B2 | | 4/2014 | Smithwick et al. | |
| 9,791,694 | B1 | | 10/2017 | Haverkamp et al. | |
| 10,108,261 | B1 | * | 10/2018 | Hall | G06F 3/013 |
| 10,242,457 | B1 | * | 3/2019 | Sibley | G06T 7/73 |

(Continued)

FOREIGN PATENT DOCUMENTS

DE  102012222053 A1  6/2013

*Primary Examiner* — Kirk W Hermann
(74) *Attorney, Agent, or Firm* — Patterson + Sheridan, LLP

(57) ABSTRACT

Systems, methods, and articles of manufacture for autostereoscopic imaging in a vehicle provide for an enhanced viewer experience. In one example, a reflector is positioned to receive an image from a projector and reflect the image onto a viewing surface through which an external scene is visible, and a camera is positioned relative to the viewing surface to observe the external scene. The system determines first and second viewing distances and viewing angles from the viewing surface to respective first and second eyes for a viewer; produces first and second sub-images for viewing at the respective eyes based on an image; and projects the first and second sub-images from the projector to the reflector to reflect the sub-images to the respective first and second positions on the viewing surface, wherein the positions are set according to the viewing distances and angles to provide a 3D image to the viewer.

20 Claims, 12 Drawing Sheets

(56) References Cited

U.S. PATENT DOCUMENTS

| | | | |
|---|---|---|---|
| 2005/0154505 A1* | 7/2005 | Nakamura | G01C 21/365 701/1 |
| 2006/0119705 A1* | 6/2006 | Liao | B60R 1/00 348/148 |
| 2006/0139751 A1* | 6/2006 | Cha | G02B 27/2214 359/465 |
| 2007/0068790 A1* | 3/2007 | Yerdon | H03K 17/962 200/600 |
| 2007/0201004 A1 | 8/2007 | O'Connell et al. | |
| 2014/0145933 A1* | 5/2014 | Chae | G06F 3/017 345/156 |
| 2016/0041386 A1* | 2/2016 | Rodriguez Moreno | G02B 27/0101 345/7 |
| 2017/0043719 A1* | 2/2017 | Wippler | B60R 1/00 |
| 2017/0075113 A1* | 3/2017 | Wu | G02B 27/0093 |
| 2017/0236332 A1* | 8/2017 | Kipman | G02B 27/0172 345/633 |
| 2017/0253181 A1* | 9/2017 | Choi | B60Q 9/008 |
| 2018/0288477 A1* | 10/2018 | Gupta | G06F 3/0482 |
| 2018/0372923 A1* | 12/2018 | Wijaya | G02B 5/045 |
| 2019/0187482 A1* | 6/2019 | Lanman | G02B 27/0179 |
| 2019/0236999 A1* | 8/2019 | Mertens | B60K 35/00 |

\* cited by examiner

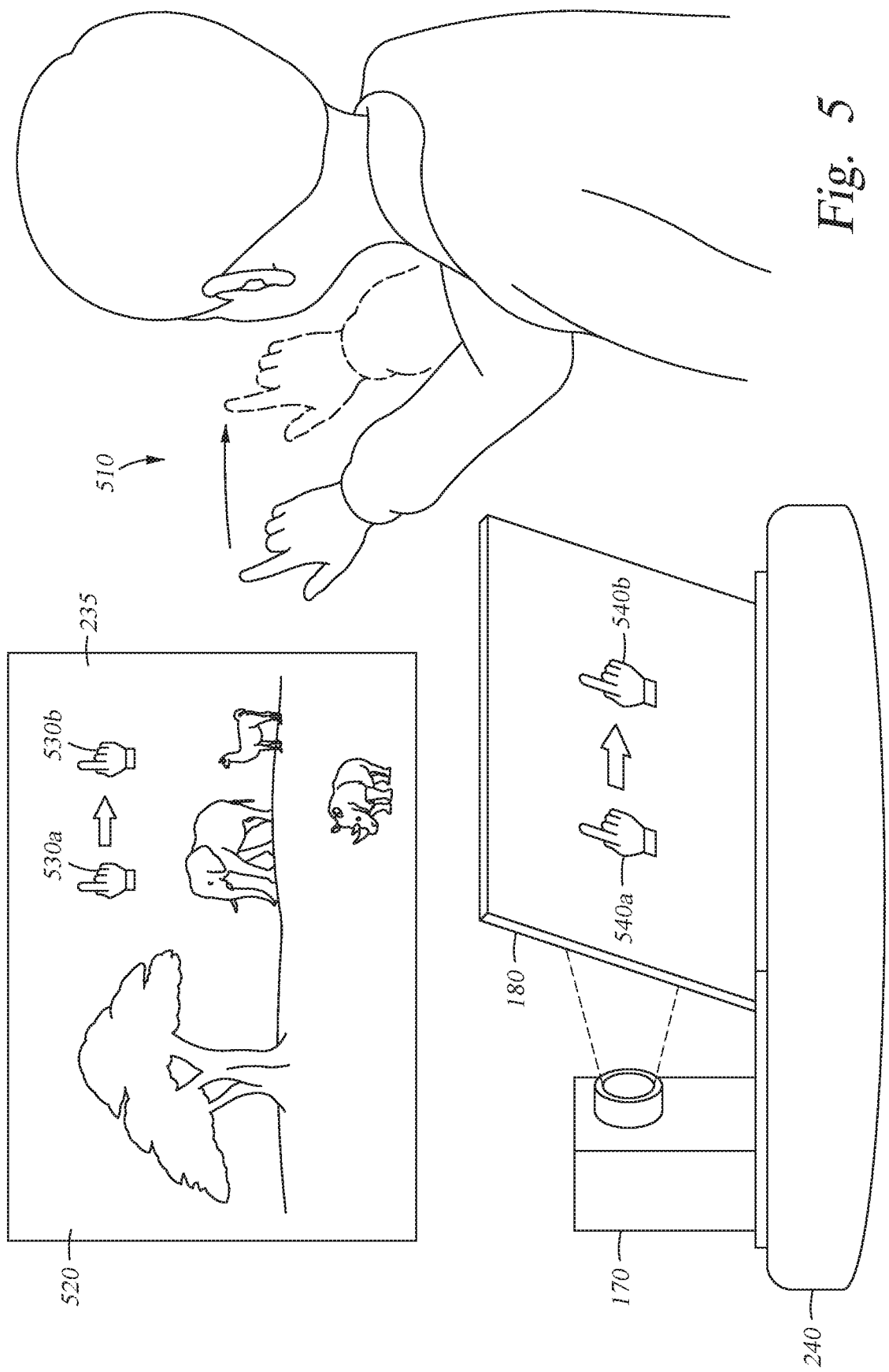

AUTO-STEREO IMAGING FOR VIEWING IN A VEHICLE

BACKGROUND

Pepper's Ghost is a practical visual effect that overlays an image onto a viewing surface through which another scene is visible. The image may be outputted from a projector or from an illuminated chamber onto a reflector. The reflector, in turn, projects the reflection onto a viewing surface in front of the scene as a ghosted image visible as part of the scene. By using a transparent viewing surface, a viewer may simultaneously see both the ghosted image and the objects in the scene behind the viewing surface.

SUMMARY

The present disclosure provides auto-stereo imaging for viewing in a vehicle, in one embodiment, via a method, comprising: determining a first viewing distance and a first viewing angle from a viewing surface to a first POV (Point of View) for a viewer; determining a second viewing distance and a second viewing angle from the viewing surface to a second POV for the viewer; producing a first sub-image for viewing at the first POV based on an image; producing a second sub-image for viewing at the second POV based on the image; projecting the first sub-image to a reflector, which reflects the first sub-image to a first position on the viewing surface; and projecting the second sub-image to the reflector, which reflects the second sub-image to a second position on the viewing surface, wherein the second position is set relative to the first position according to the first viewing distance, the second viewing distance, the first viewing angle, and the second viewing angle.

In another embodiment, the present disclosure provides auto-stereo imaging for viewing in a vehicle via a method, comprising: affixing a projector in a cabin of a vehicle, aligned to project an image inward to the cabin of the vehicle; affixing a reflector in the cabin of the vehicle relative to the projector to reflect the image outward from the cabin of the vehicle onto a window of the vehicle; determining distances and angles from the window of the vehicle to eyes of a viewer in the cabin of the vehicle; and projecting the image from the projector to the reflector to the window to the viewer based on the distances and the angles.

In a further embodiment, the present disclosure provides for auto-stereo imaging in a vehicle via a system, comprising: a projector mounted in a vehicle; a reflector positioned to receive an image from the projector and reflect the image onto a viewing surface through which a scene external to the vehicle is visible; a camera, positioned relative to the viewing surface to observe the external scene; a processor; and a memory, including instructions that when executed by the processor enable the system to: determine a first viewing distance and a first viewing angle from the viewing surface to a first POV for a viewer; determine a second viewing distance and a second viewing angle from the viewing surface to a second POV for the viewer; produce a first sub-image for viewing at the first POV based on an image; produce a second sub-image for viewing at the second POV based on the image; project the first sub-image from the projector to the reflector to reflect the first sub-image to a first position on the viewing surface; and project the second sub-image from the projector to the reflector to reflect the second sub-image to a second position on the viewing surface, wherein the second position is set relative to the first position according to the first viewing distance, the second viewing distance, the first viewing angle, and the second viewing angle.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 5 illustrates an example of gesture control with an Augmented Reality Entertainment System, according to one embodiment described herein.

DETAILED DESCRIPTION

Figure 1:
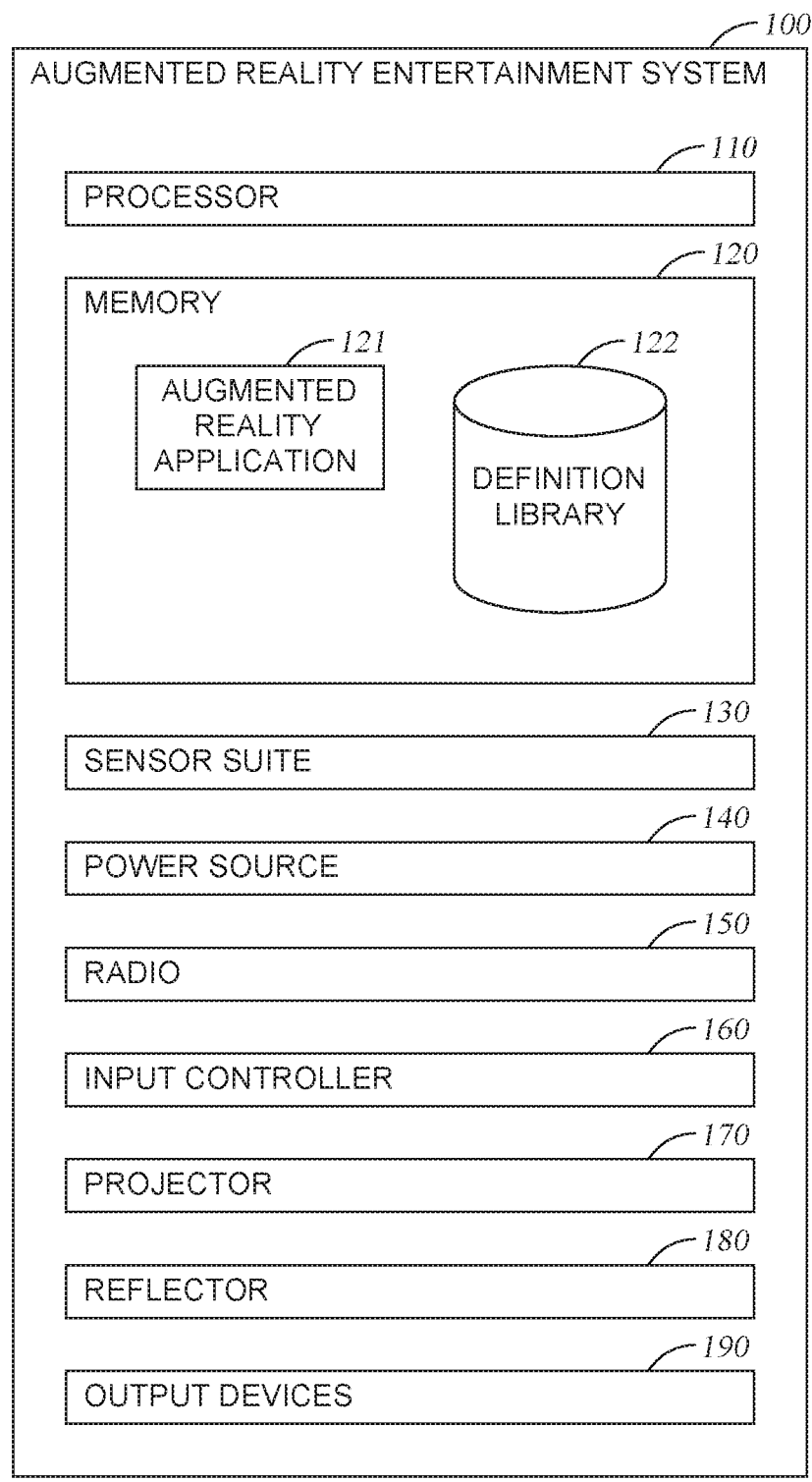
FIG. 1 is a block diagram of the components of an example Augmented Reality Entertainment System, according to one embodiment described herein.

The present disclosure describes systems and methods for employing Pepper's Ghost in autostereoscopic imaging for viewing in a vehicle. The vehicle may be any one of a car, a bus, a train, an airplane, a boat, or the like in which a passenger is afforded a window to look outside of the vehicle. An Augmented Reality Entertainment System (ARES) is provided to the passenger, as a viewer, to augment the scene visible outside of the window. The ARES employs a projector and a reflector to display images to the viewer overlaid over the visible scene on the window. To conserve space, and improve the ease of integrating the ARES with the vehicle, the ARES may be mounted on an armrest or similar point between the viewer and the window, and project the image as a ghosted image via the reflector onto the viewing surface of the window.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a block diagram of the components of an example ARES 100. In various embodiments, the components of a given ARES 100 may vary from those illustrated in FIG. 1, and several instances of each component may be included in a given ARES 100. The internal components include a processor 110, a memory 120, a sensor suite 130, a power source 140, a radio 150, an input controller 160, a projector 170, a reflector 180, and may include other output devices 190.

The processor 110 and the memory 120 provide computing functionality to the ARES 100. The memory 120 may be one or more memory devices, such as, for example, Random Access Memory (RAM), Read Only Memory (ROM), flash memory, or any other type of volatile or non-volatile storage medium that includes instructions that the processor 110 may execute to affect the ARES 100. The processor 110, which may be any computer processor capable of performing the functions described herein, executes commands included in the instructions, which may include performing certain tasks in response to signals received via the sensor suite 130 or the radio 150.

The memory 120 generally includes program code for performing various functions related operating the ARES 100. The program code is generally described as various functional "applications" or "modules" within the memory 120, although alternate implementations may have different functions and/or combinations of functions. Within the memory 120, the Augmented Reality (AR) Application 121 is generally configured to control what images the ARES 100 overlays onto a scene, and where to display those images in relation to the scene, while the image definition library 122 is generally configured to provide definitions for which various scenes or objects in the scenes may be identified.

The sensor suite 130 may include a Global Positioning System (GPS) receiver, scene-facing cameras, scene-facing range finders, viewer-facing cameras, viewer-facing rangefinders, and the like. For example, a scene-facing camera may be used in combination with the image definition library 122 to identify various objects in the scene. In another example, a viewer-facing camera may be used to identify various gestures made by the viewer for use as commands to the ARES 100. The sensor suite 130 may include additional sensors, several instances of each sensor, or may omit some of the example sensors discussed herein.

The power source 140 provides electric power to the various components of the ARES 100. Various examples of power sources 140 include batteries (rechargeable and non-rechargeable), solar cells, Alternating Current to Direct Current (AC/DC) converters, Direct Current to Alternating Current (DC/AC) converters, transformers, capacitors, inductors, and wiring to connect to an external power source 140.

The radio 150 provides wireless communications for the ARES 100. In some embodiments, the radio 150 is a receiver, which receives signals from external sources to inform how the ARES 100 is to behave. In other embodiments, the radio 150 is a transmitter, which transmits signals to external devices. The radio 150 may be in communication with various antennas and may configure messages to be transmitted or received according to various standards, such as, WiFi®, Bluetooth®, or a proprietary standard.

The input controller 160 included in the ARES 100 may be provided to connect various input devices, such a keyboards, mice, video game controllers, microphones, gesture recognizers, etc. to the ARES 100 and to interpret the inputs for use with the AR application 221. The input controller 160 may accept inputs from a user that are received via wired transmission or wireless transmission (e.g., Bluetooth® signals, infrared beams).

Projector 170 generates an image to be overlaid on the scene. The projector 170 may generate images to project a User Interface (UI), a movie, a video game, and/or an Augmented Reality experience, which may include passive and/or interactive elements displayed in relation to an environment behind the surface on which the images are projected (relative to a viewer).

In various embodiments, the projector 170 is an autostereoscopic projector, which produces the image as a left-eye sub-image and a right-eye sub-image to produce a combined image for a viewer that appears three-dimensional, as each of the viewer's eyes are provided with different sub-images. Stated differently, to provide the image with a 3D effect, rather than as a 2D image, two 2D sub-images that are based on the original 2D image are created and co-projected with a spatial offset from one another so that the viewer is provided with an optical illusion of a 3D object being projected. The sensor suite 130 may determine the distance to each of the viewer's eyes so that the sub-images may be altered from a base image to provide an intended 3D effect when viewed by each eye.

The reflector 180 provides one or more reflective surfaces onto which the projector 170 may project an image (and sub-images thereof) to reflect onto a viewing surface to overlay a real-world scene. In various embodiments, the reflector 180 includes a controller to position or focus the reflector 180 relative to the projector 170 and the desired viewing surface to affect where the reflected image is displayed. In one example, the reflector 180 is a mirror (flat, convex, or concave) that may have a pitch or attitude adjusted via a motor controlled by the AR application 121 to affect where an image is projected onto the scene. In a second example, the reflector 180 includes a varifocal surface with one or more lenses to focus a projected image with a lower-intensity light into a (relatively) higher-intensity ghosted image (e.g., a Fresnel lens). In a third example, the reflector 180 includes a lenticular array of one or more controllable lenses or light permissive/blocking pixels that bend or block light reflection at certain times or polarizations. The reflector 180 may include a first reflecting surface and a second reflecting surface so that a first sub-image is reflected by the first reflecting surface to the viewing surface via a different pathway than a second sub-image reflected by the second reflecting surface to the viewing surface. Each of the reflective surfaces may be aligned or times to provide separate sub-images to each of the user's eyes to thereby produce an optical illusion of a 3D effect for the projected image.

In an autostereoscopic system, the projector 170 may project each sub-image with a different polarity of light, and one or more of the reflector 180 or a display surface may be controlled to affect the display thereof. In some embodiments, the sub-images are produced in coordination with the reflector 180 or the viewing surface to produce the 3D effect by alternating in time which sub-image is reflected for display.

The output devices 190 may include various lights, displays, and speakers for providing output from the ARES 100 in addition to that provided by the radio 150 and/or projector 170. A Light Emitting Diode (LED) or a seven-segment display are examples of output devices 190 that provide a visual effect for the ARES 100 when certain actions are performed by the ARES 100 (e.g., power-on, scoreboard). In another example, a speaker or headphone jack is an output device 190 that provides audio output (e.g., of a sound effect or voice recording) when certain actions are performed by the ARES 100.

Figure 2A:
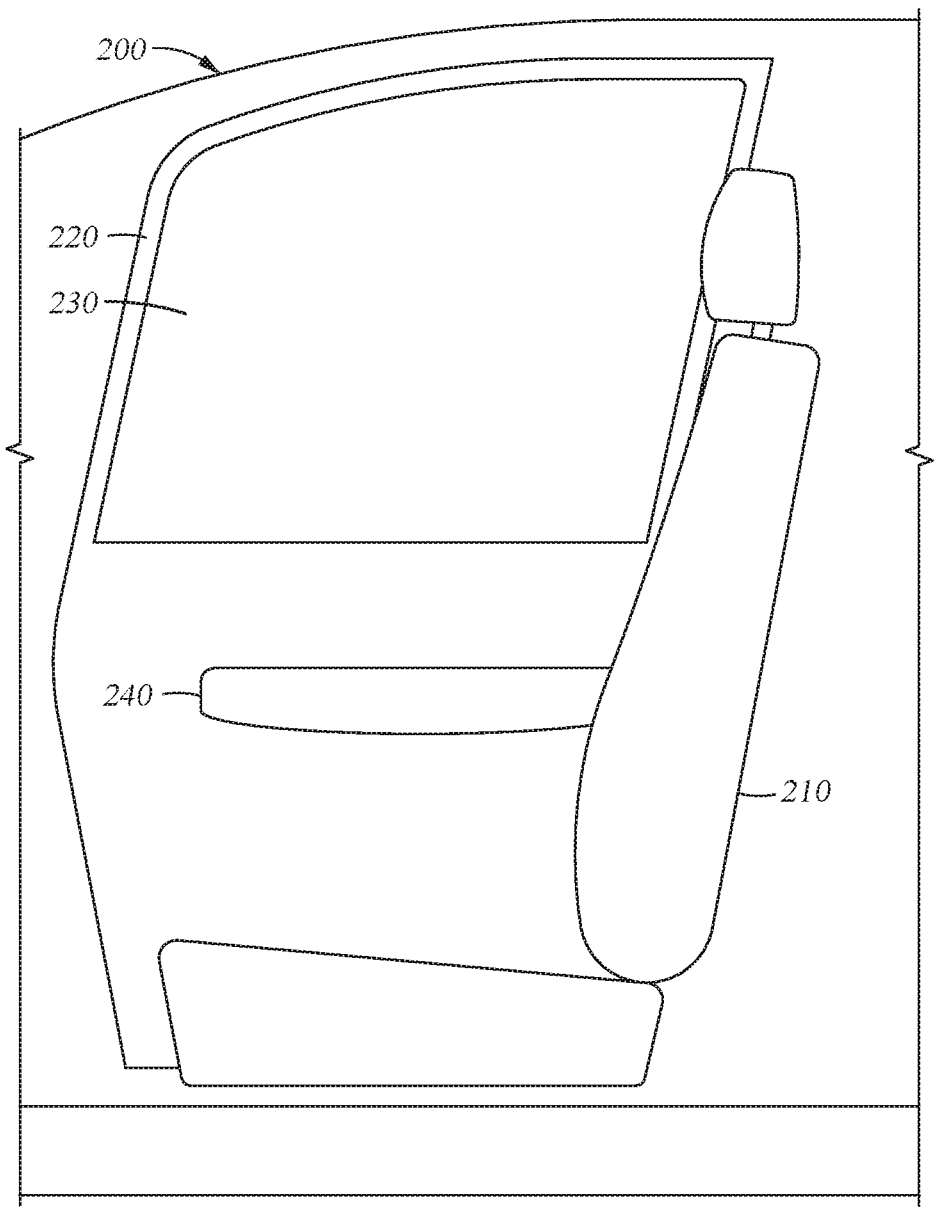
FIGS. 2A-E illustrate various examples of an installation for an Augmented Reality Entertainment System in a vehicle, according to embodiments described herein.
Figure 2B:
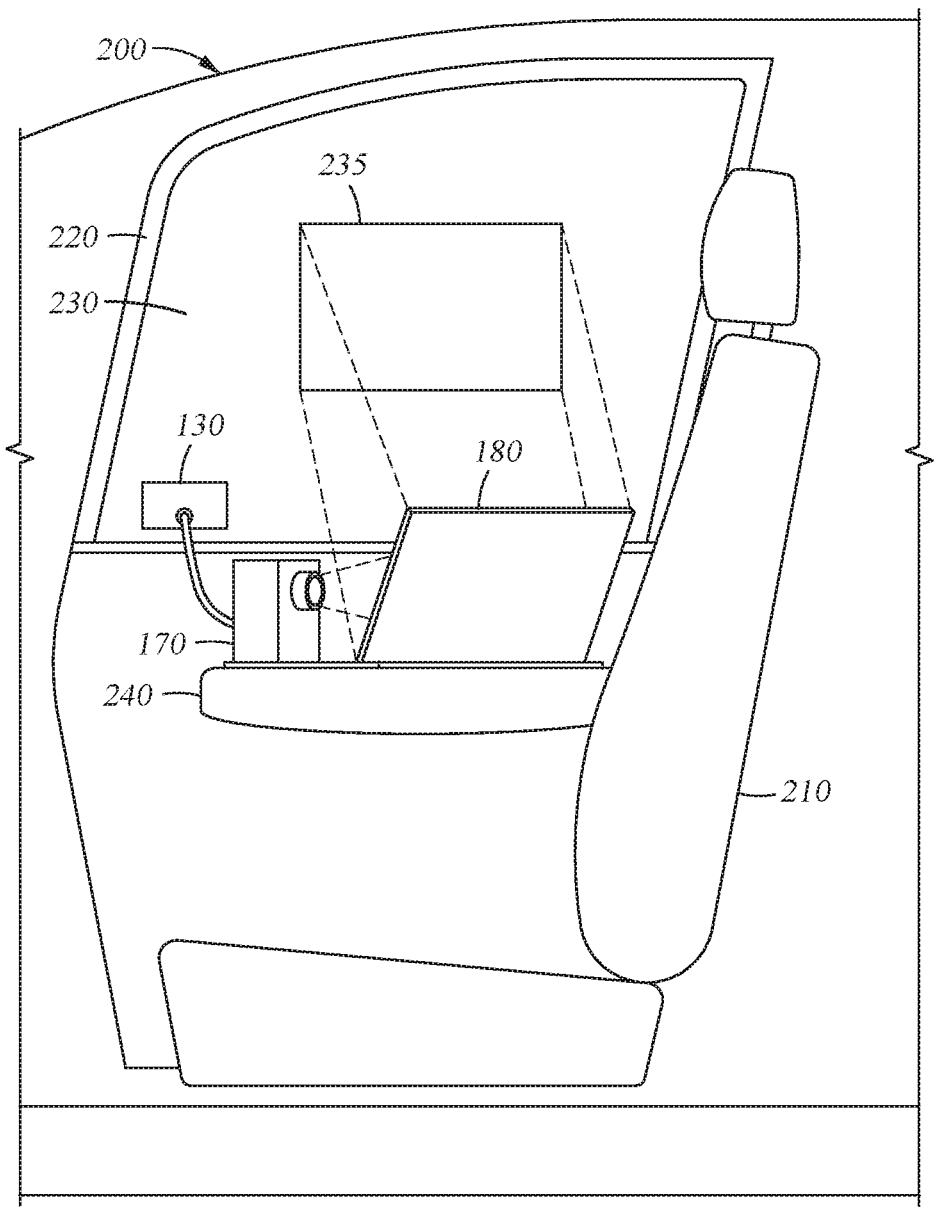
Figure 2C:
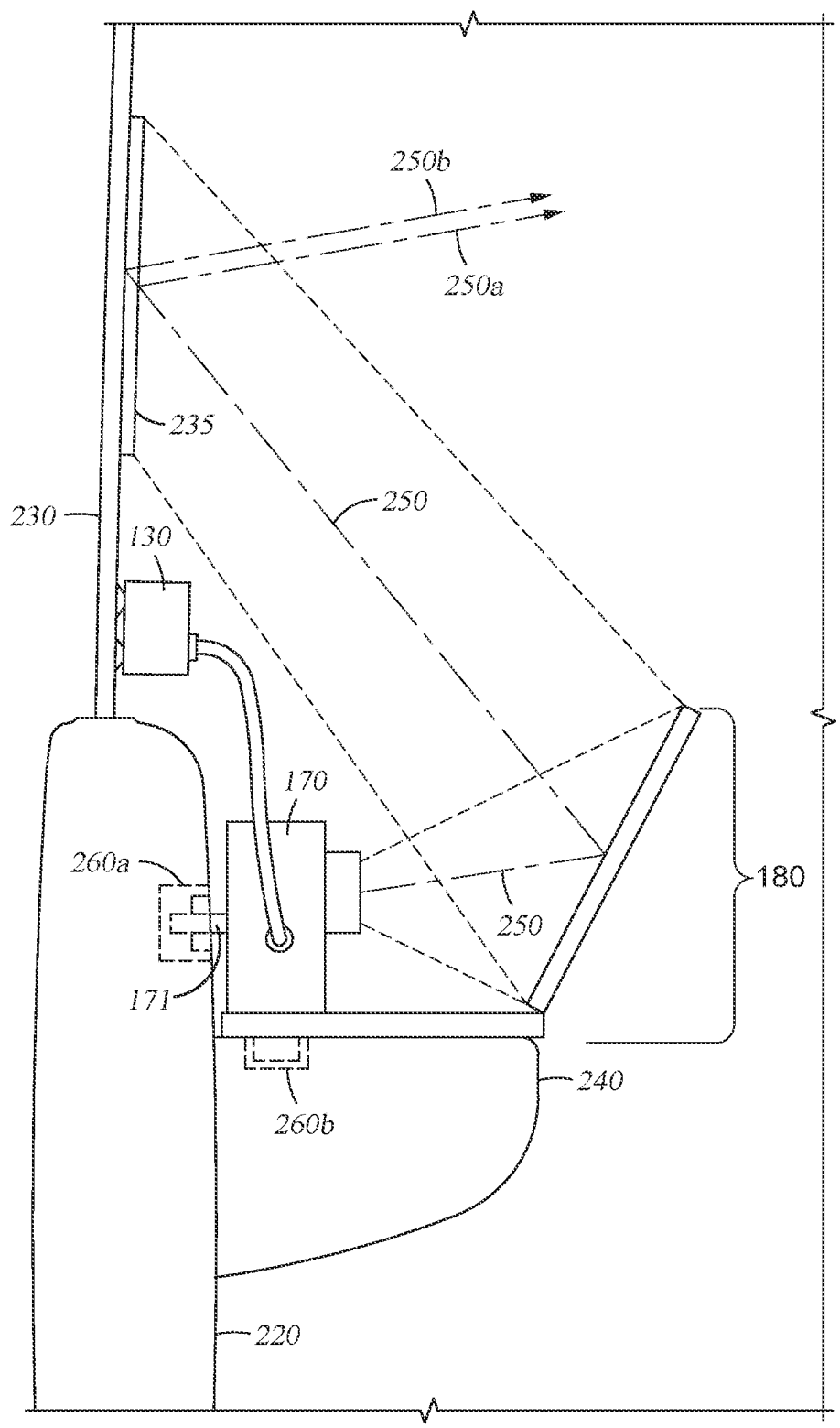

FIGS. 2A-D illustrate various examples of an installation for an ARES 100. FIG. 2A illustrates the interior of a vehicle 200 in which an ARES 100 may be selectively installed and uninstalled. FIG. 2B illustrates the same example interior as FIG. 2A in which an example ARES 100 has been installed. FIG. 2C illustrates an alternative view of the interior of the vehicle 200 with an installed ARES 100. The ARES 100 may be selectively installed by temporarily affixing portions of the ARES 100 to portions of the vehicle 200, which may be selectively uninstalled without structurally affecting the vehicle. In some embodiment, the ARES 100 may be permanently installed or integrated in a vehicle 200, and the removal of the ARES 100 may structurally affect components of the vehicle 200.

The illustrated components of the vehicle 200 show components of a cabin for the vehicle 200, which include, but are not limited to: a chair 210, a panel 220, a window 230, and an armrest 240. The chair 210 provides a location that the viewer for the ARES 100 is located in the vehicle 200. The chair 210 may include securing features (e.g., seat belts, booster seats), adjustable features (e.g., reclining backs, leg room adjustors, seat attitude adjustors, headrest adjusters), and various controls 260a, 260b (generally, controls 260) based on the vehicle 200.

The panel 220 is a structural element of the vehicle 200 that includes a window 230. Depending on the vehicle 200 and where the chair 210 is located in the vehicle 200, the panel 220 may be a wall of the vehicle 200 or may be door for the vehicle 200. For example, if the chair 210 is the front passenger seat for a two-door coupe, the panel 220 may be the passenger door, while if the chair is a rear passenger seat for that coupe, the panel 220 may be the interior cabin wall for the (doorless) rear seats. The window 230 in the panel 220 provides the viewer in the chair 210 with a view of a scene the environment outside of the vehicle 200. The window 230 is located between the viewer and the scene of the outside environment onto which the ARES 100 projects images for the viewer. The window 230 may be adjustable in some vehicles 200 (e.g., rolled up or rolled down) or fixed in other vehicles 200, and the ARES 100 when installed may physically (e.g., via a male extension 171 from a projector 170) or electrically interlock the controls 260 for the window 230 to prevent the window from opening when the ARES 100 is installed.

A portion of the sensor suite 130 of the ARES 100, such as a camera sensor, infrared sensor, range finder, or the like, may be mounted to the window 230 so that the ARES 100 may observe various objects in the scene outside of the vehicle 200 to adjust the images projected for display to the viewer.

In various embodiments, such as those illustrated in FIGS. 2B and 2C, a portion of the window 230 is designated as a designated viewing surface by an applied film 235 onto which the images from the projector 170 are projected (via the reflection from the reflector 180). The film 235 may be placed on the window 230 and held in place via Van der Waals forces (e.g., as a static cling), suction cups, magnets, or the like so that the film 235 may be selectively applied and removed from the window 230.

Figure 2D:
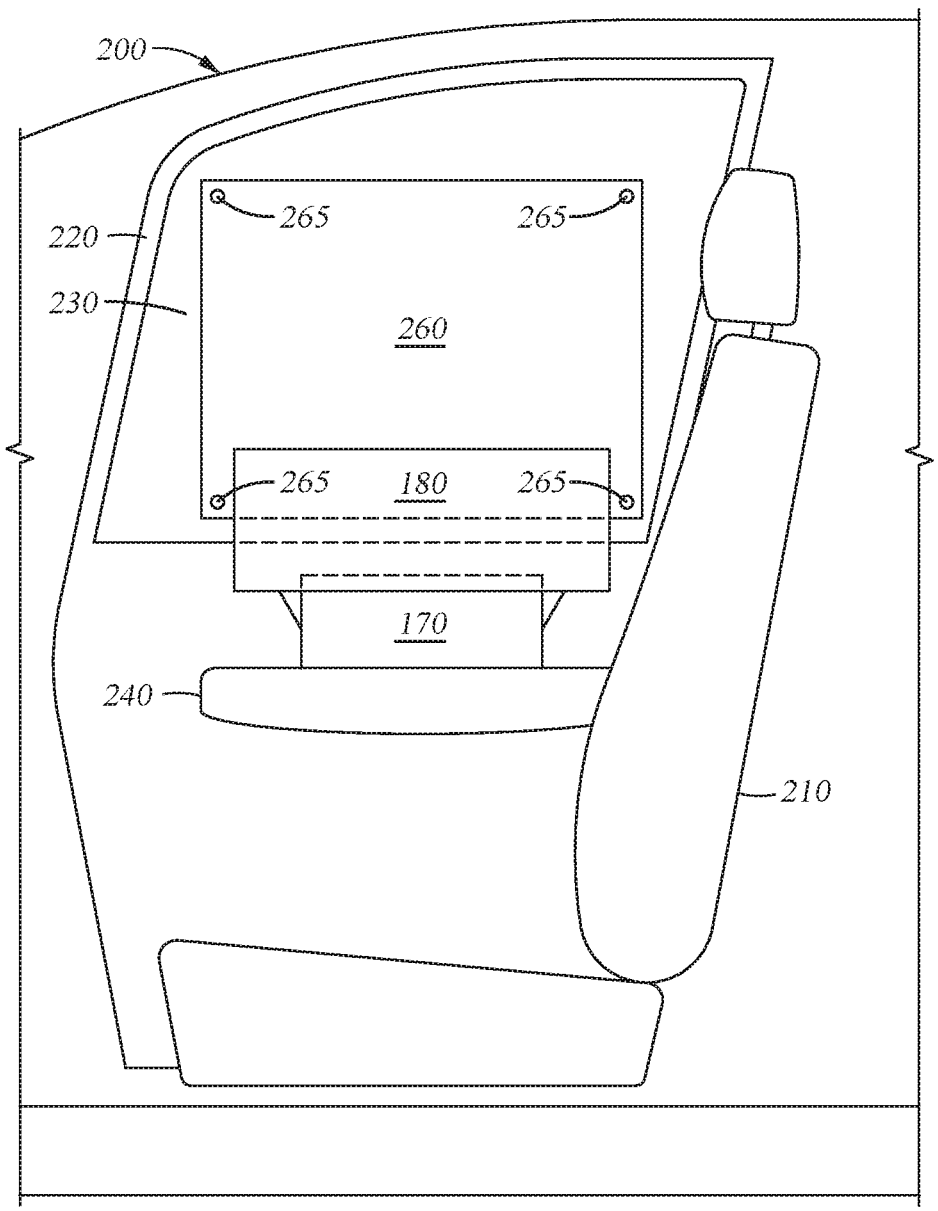
Figure 2E:
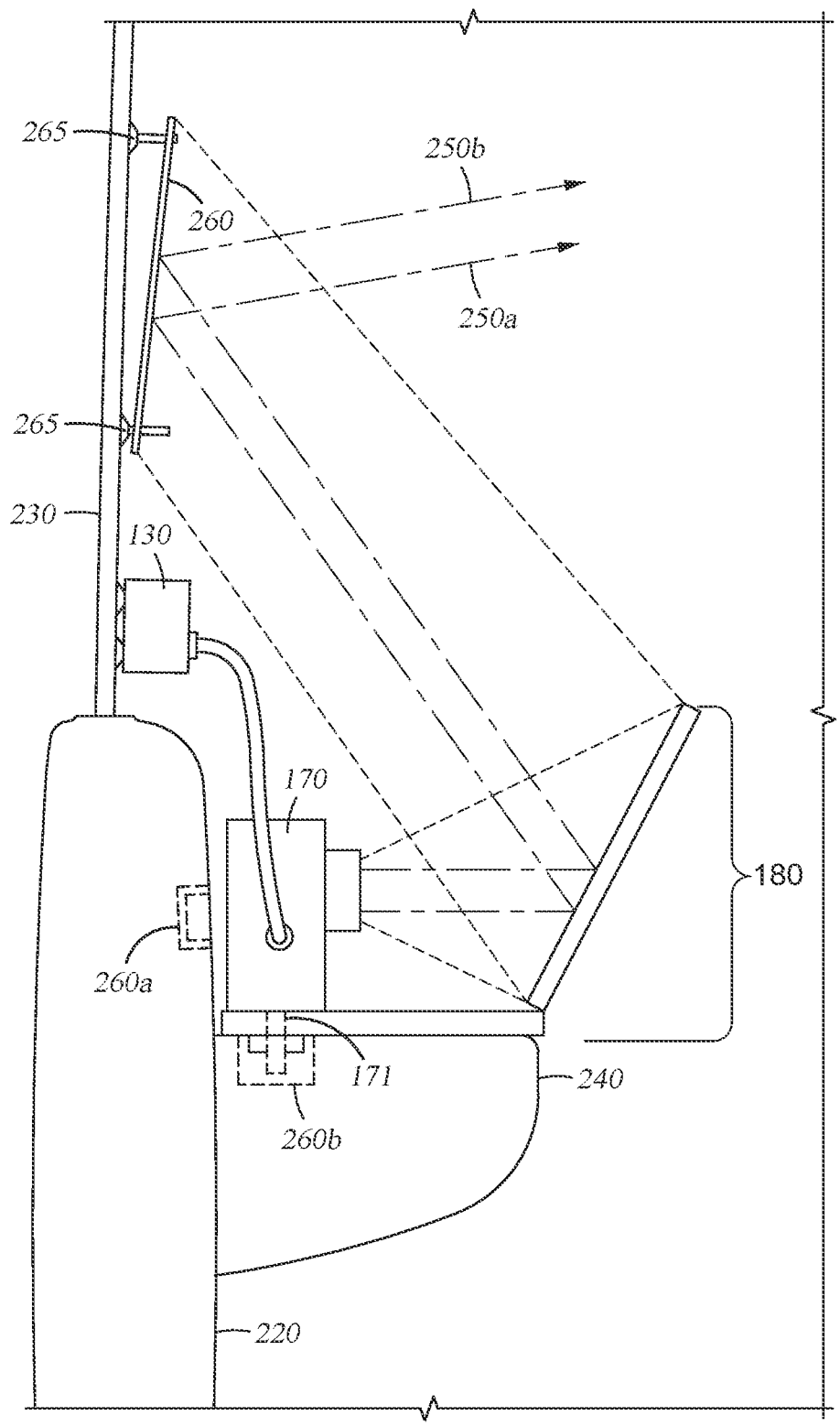

In various embodiments, such as those illustrated in FIGS. 2D and 2E, a portion of the window 230 is designated as a designated viewing surface by a partially reflective surface 260 mounted to the window 230 onto which the images from the projector 170 are projected (via the reflection from the reflector 180). The partially reflective surface 260 may be mounted with an offset relative to the plane of the window 230, for example by mounting spacers 265. In various embodiments, the mounting spacers 265 include a suction cup at one end to affix to the window 230 and a strut extending from the suction cup by which the reflective surface 260 is secured to the mounting spacer 265 (and thereby the window 230 when installed). The struts of the mounting spacers 265 have lengths configured to offset and angle the partially reflective surface 260 relative to the window 230, and the suction cups enable the partially reflective surface 260 to be selectively applied and removed from the window 230 without damage to the window 230 or leaving a residue.

In some embodiments, the mounting spacers 265 are adjustable in the length, so as to provide different offsets from the window 230 for the partially reflective surface 260. Adjustable mounting spacers 265 allow the viewer to selectively adjust the angle of incidence of the partially reflective surface 260 relative to the window 230 and to account for differing arrangements of windows 230 relative to the panels 220 in vehicles 200. In some embodiments, a processor 110 may control motors or actuators that selectively adjust the lengths of offset for individual mounting spacer 265 to angle the partially reflective surface 260 in response to the viewer moving within the cabin of the vehicle 200 to preserve autostereoscopic 3D imaging.

In various embodiments that use a partially reflective surface 260, the partially reflective surface 260 may be independently mounted to the window 230, or may be mounted to the window 230 and support one or more of the projector 170 and reflector 180; effectively mounting one or more of the projector 170 and reflector 180 to the window 230 via the of the partially reflective surface 260 and the mounting spacers 265. In other embodiments, the partially reflective surface 260 may be held in place relative to the window 230 and reflector 180 via struts or other support members extending from the projector 170 or reflector 180; effectively mounting the partially reflective surface 260 in the vehicle 200 via the armrest 240 and without contact with the window 230 (the mounting spacers 265 may be omitted in such embodiments).

The film 235 or partially reflective surface 260 may provide a beam splitter so that a light pathway 250 from the projector 170, to the reflector 180, to the film 235 or partially reflective surface 260 may be split into a first split light pathway 250a and a second split light pathway 250b (generally referred to as split light pathways 250n) to provide a 3D effect for the projected image, while allowing images from an external scene to be transmitted to the viewer. In some embodiments, the film 235 or partially reflective surface 260 includes a lenticular array of one or more controllable lenses or light permissive/blocking pixels that bend or block light reflection at certain times or polarizations to provide different sub-images to each eye of the viewer from an interlaced image originally generated by the projector 170. The film 235 or partially reflective surface 260 may include a first reflecting surface off of which the first split light pathway 250a is reflected, and a second reflecting surface off of which the second split light pathway 250a is reflected. Each of the split pathways 250n may be aligned to the viewer's eyes to provide an optical illusion of a 3D effect for the projected image. In some examples, each lenticular lens of the array is polarized differently on each side of the lens so as to reflect light of a first polarity from a first side of the lens and light of a second polarity from a second side of the lens, but to block or absorb light of the second polarity from the first side of the lens and light of the first polarity from the second side of the lens.

The window 230, the film 235, and/or the partially reflective surface 260 may be tinted to reduce or color shift light from the environment that enters the cabin of the vehicle 200. To provide an AR experience, up to about 50% of the light from the environment may be blocked by the window 230, the film 235, and/or the partially reflective surface 260. By blocking some but not all of the light from the environment, the scene remains visible to the viewer, but the projector 170 may use a lower-intensity light to produce a ghosted image with a higher contrast to the visible scene than if light were not blocked from the environment.

The armrest 240 may be a component of the chair 210 or of the panel 220 in various embodiments. The armrest 240 provides one or more surfaces on which a projector 170 and/or a reflector 180 may be mounted. The armrest 240 is located between the viewer and the window 230 so that the ARES 100 may be mounted to the armrest 240 and not interfere with other occupants of the vehicle 200 or be blocked by the occupants of the vehicle 200. The armrest 240 may include cup holders, hand holes, control wells (e.g., indentations for the controls 260 the window 230), pockets, or other cavities in which a portion of the ARES 100 may be inserted to temporarily install the ARES 100 in the vehicle 200. In additional embodiments, the ARES 100 may include straps, hook and loop fasteners, magnets, suction cups, clamps, or the like to secure the ARES to the armrest 240.

For example, by mounting the projector 170 and the reflector 180 on the armrest 240, between the viewer and the viewing surface, the viewer is less likely to occlude or block a light pathway 250 between the projector 170 and the reflector 180 than projectors that are located behind the viewer relative to the window 230. Additionally, the disclosed arrangement reduces the amount of projected light that is visible within the cabin to other occupants (such as a driver or a viewer using a second ARES 100 on a different window 230), thus allowing the projector 170 to produce images with higher contrast to the scene onto which those images are project with less (or lower intensity) light being projected to other occupants in the vehicle 200.

Figure 3A:
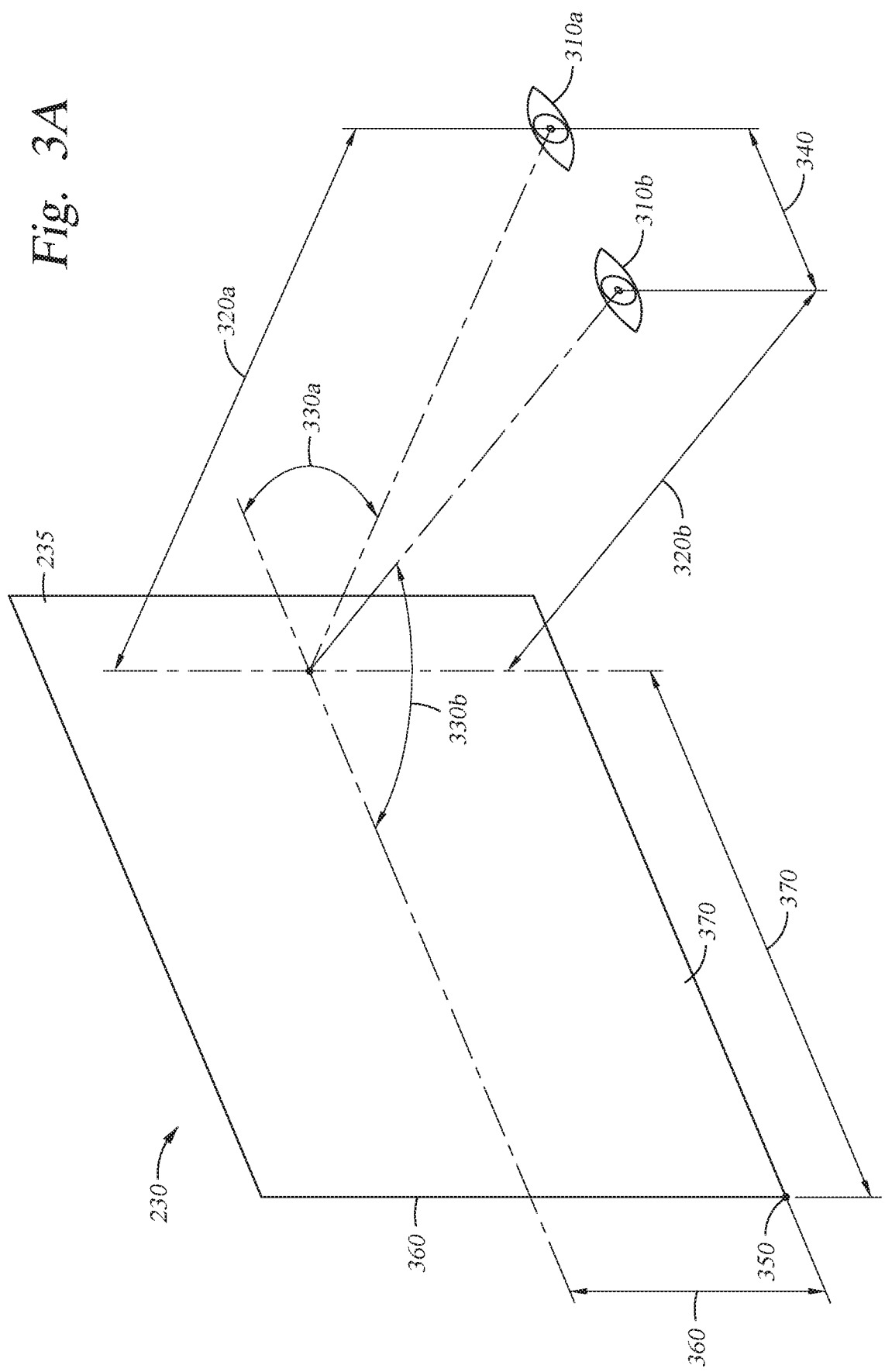
FIGS. 3A and 3B illustrates example light pathways from a viewing surface to the viewer, according to embodiments described herein.
Figure 3B:
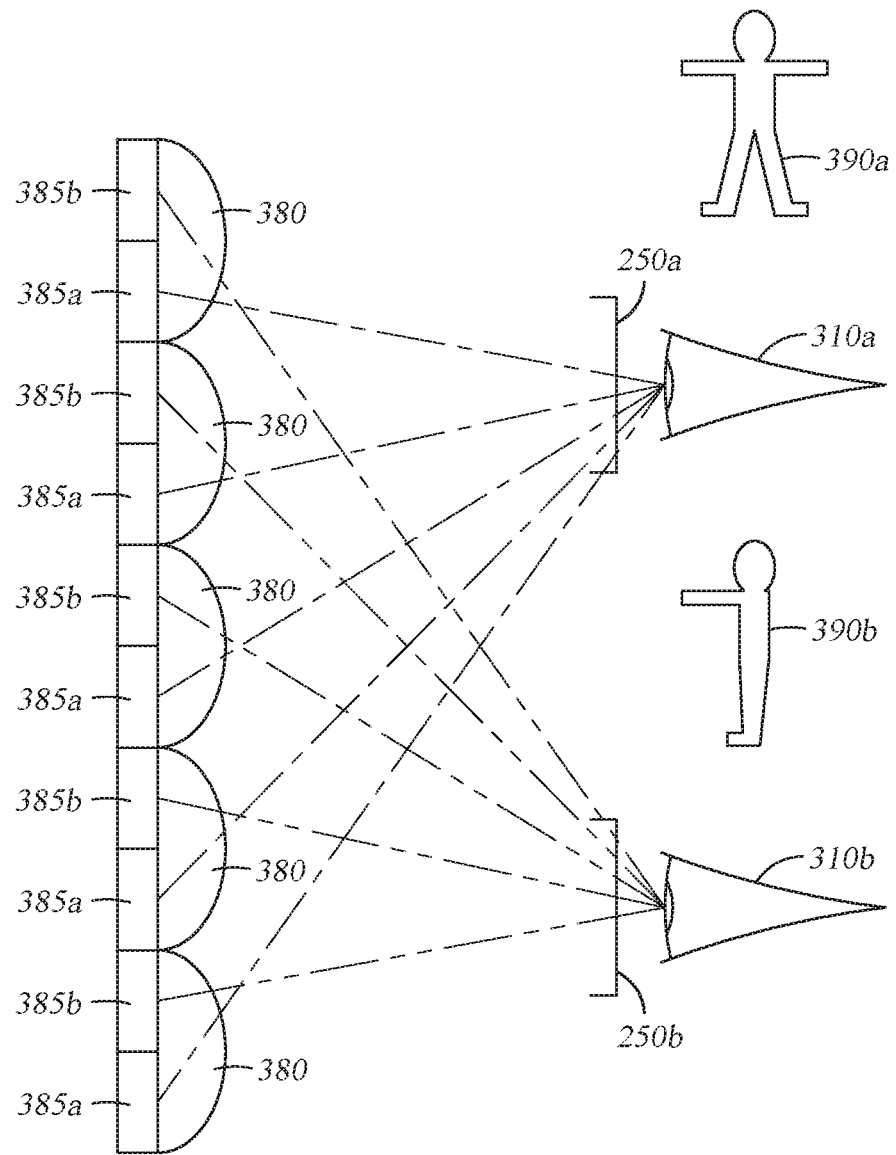

FIGS. 3A and 3B illustrate example light pathways from a viewing surface to the viewer. The Points of View (generally, POV 310) from each of the viewer's eyes are shown in FIG. 3A relative to the film 235; a right POV 310a from a right eye and a left POV 310b. Several features of the POV 310 relative to one another and a given portion of the viewing surface may be calculated and used by the projector 170 and/or reflector 180 to provide images to the viewer. For example, a viewing distance 320 from the viewing surface to the POV 310 (e.g., a first viewing distance 320a to the right POV 310a and a second viewing distance 320b to the left POV 310b), a viewing angle 330 between each light pathway 250 from the viewing surface to the POV 310 (e.g., a first viewing angle 330a to the right POV 310a and a second viewing angle 330b to the left POV 310b), and an intra-POV distance 340 between the POV 310 may be determined.

To aid in the determination of the various distances and angles for viewing, the sensor suite 130 may use image processing to identify the eyes of the viewer (e.g., based on an image definition for an eye, facial features surrounding an eye, identified relative sizes of the eyes, orientations of the eyes). Because the reflector 180 and the viewing surface are used to reflect the image from the projector 170 to the viewer, and mirrored surfaces are bidirectional, images of the viewer's eyes may be reflected from the viewing surface, to the reflector 180, to a camera sensor in the sensor suite 130. An example camera may be located proximate to or integrated into the projector 170 to estimate the distances and angles to the viewer's eyes. In another example, the ARES 100 may use a laser rangefinder to determine a distance to the viewer to locate the two POV 310 for the viewer. In a third example, the viewer may manually set one or more of the viewing distances 320, viewing angle 330, and the intra-POV distance 340 from a designated point on the viewing surface.

As will be appreciated, the portion of the viewing surface from which the various distances and angles are determined affects the values of those distances and angles, and an image projected onto the viewing surface is projected across several portions of the viewing surface. The illustrated distances and angles are shown relative to an origin 350 of the film 235 used as the viewing surface at a height 360 and a length 370 from the origin 350. The ARES 100 may therefore calculate several distances and angles from several locations defined by various heights 360 and lengths 370 from the origin 350. In some embodiments, individual lenses in a film 235, a partially reflective surface 260, or the reflector 180 are controlled to provide several different viewing angles 330 for different positions on the viewing surface to provide different sub-images to each POV 310 so that the viewer will interpret the images as 3D.

FIG. 3B illustrates several light pathways 250 influenced by a lenticular array, as may be included in a reflector 180, film 235, or partially reflective surface 260, to produce an autostereoscopic 3D effect for a viewer. For purposes of clarity, discussion of the light pathways 250 will focus on reflected images transmitted from the projector 170, although the lenticular array may also transmit light from the environment outside of the vehicle 200 to a viewer by one or both of the light pathways 250n illustrated.

The illustrated lenticular array includes a plurality of lenticular lenses 380. Several lenticular lenses 380 may be arranged in vertical columns to make up the array so that each lenticular lens 380 of the array is oriented to provide two separate images to the viewer; one to the right eye from the right curve/surface of the lenticular lens 380 and one to the left eye from the left curve/surface of the lenticular lens 380.

Each lenticular lens 380 may be backed by a semi-reflective/semi-transmissive surface, which allow at least some light projected from behind the lenticular array (e.g., from the environment) to transmit through the lenticular lenses 380 and at least some light projected from in front of the lenticular array (e.g., from the projector 170) to be reflected to the viewer. In some embodiments, such as when the lenticular array is included in the reflector 180, each lenticular lens 380 may be backed by a reflective surface, so that at least some light projected from the projector 170 is reflected to the viewing surface to the be reflected to the viewer.

The backing surface for each lenticular lens 380 may be divided into a first imaging surface 385a and a second imaging surface 385b. In some embodiments, the first imaging surface 385a and the second imaging surface 385b are polarized with opposite polarities to one another, so that light of a first polarity received from the projector 170 is reflected to the first POV 310a (and not the second POV 310b) from the first imaging surface 385a and so that light of a second polarity received from the projector 170 is reflected to the second POV 310b (and not the first POV 310a) from the second imaging surface 385b. In other embodiments, the left and right halves of each lenticular lens 380 are polarized with opposite polarities to one another so that light of a first polarity received from the projector 170 is reflected to the first POV 310a (and not the second POV 310b) of the viewer and so that light of a second polarity received from the projector 170 is reflected to the second POV 310b (and not the first POV 310a) of the viewer.

The curved surfaces of each lenticular lens 380 may act as a beam splitter for light projected onto the lenticular array, or may each receive and transmit light transmitted on a split pathway 250n. In some embodiments, a processor 110 may adjust the radius of curvature for each lenticular lens 380 via mechanical and/or liquid means to affect the individual split light pathways 250n that light travels to the POVs 310 of the viewer. The curvature adjustments may be made in response to the viewer moving within the cabin of the vehicle 200, so as to maintain pathways 250 that provide autostereoscopic imaging for the viewer regardless of where the viewer's eyes are physically located in relation to the lenticular array.

When providing an autostereoscopic image to the viewer, the projector 170 provides different sub-images 390 to each POV 310 of the viewer via the separate pathways 250 provided by the lenticular lenses 280. The first sub-image 390a, provided to the first POV 310a (e.g., the right eye), shows a first perspective of an object, whereas the second sub-image 390b, provided to the second POV 310b (e.g., the left eye), shows a second perspective of the same object that the viewer will mentally reconcile into a three-dimensional view of the object.

Figure 4A:
FIGS. 4A and 4B illustrate several examples of a scene viewed through the viewing surface, onto which an augmented reality image is reflected, according to embodiments described herein.
Figure 4B:
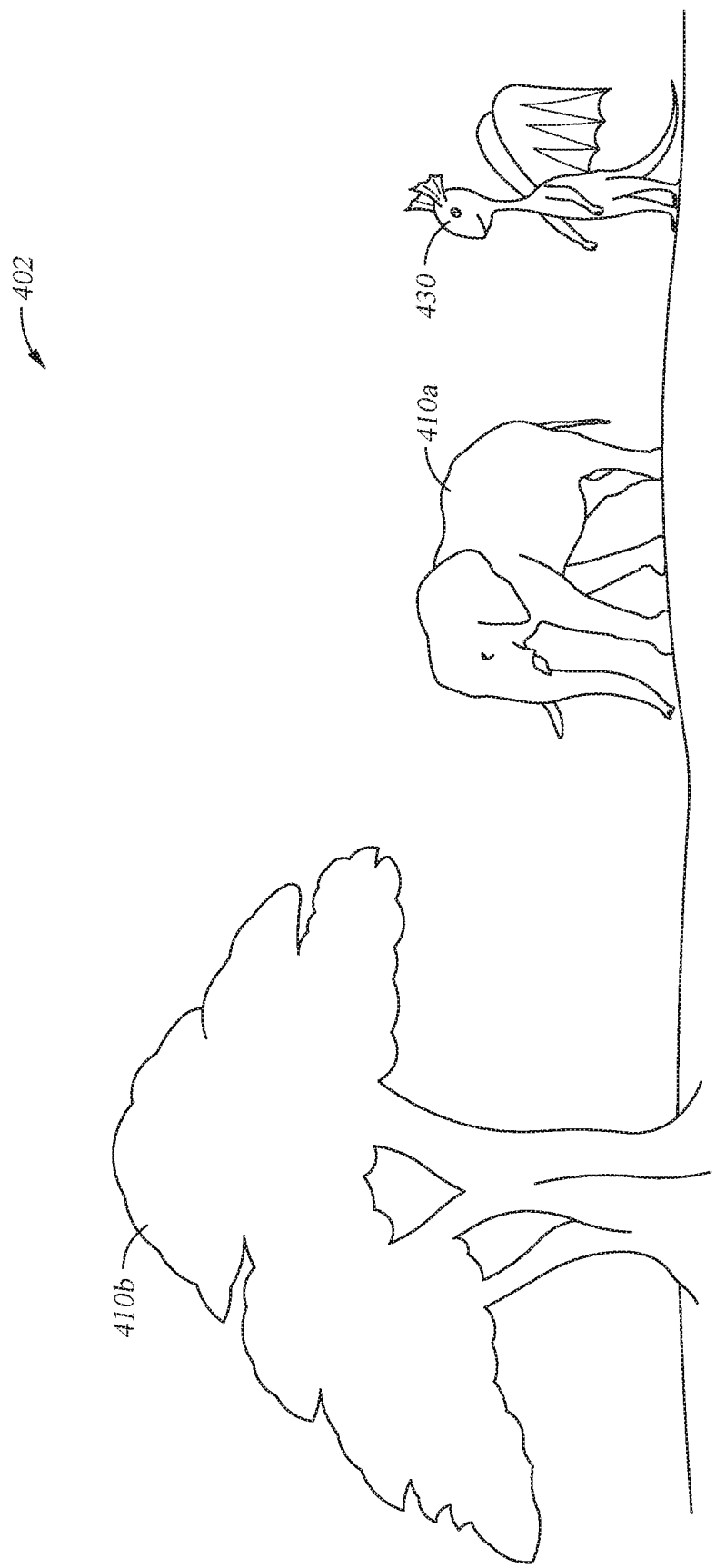

FIGS. 4A and 4B illustrate several examples of a scene viewed through the viewing surface, onto which an augmented reality image is reflected. The examples are provided for purpose of illustration and discussion, and are not limiting of the plethora of potential scenes and/or images that an ARES 100 may work with and/or provide. Each of FIGS. 4A and 4B illustrate the same scene visible through the viewing surface from the perspective of the viewer, with different images overlaid onto that scene. An ARES 100 may provide a variety of images in one or both of 2D and 3D formats based on the environment and/or independently of the environment visible in the scene.

The first view 401, shown in FIG. 4A, includes a first real object 410a of an elephant (generally, real object 410), a second real object 410b of a tree, and a 2D Augmented Reality object (2D AR object 420) of a factoid overlaid onto the real-world scene of the elephant and the tree. The example factoid is presented within the 2D AR object 420 in relation to the first real object 410a, and is shown providing information related to elephants. Other 2D AR objects 420 may be presented independently of the real objects 410 in the scene, such as, for example, UI elements. 2D AR objects 420 may be produced by providing identical sub-images of an original image to each of the viewer's eyes, by providing images to one of the viewer's eyes, and/or by controlling the projection or reflection of the image for viewing angles 330 of 90°.

The second view 402, shown in FIG. 4B, includes a first real object 410a of an elephant, a second real object 410b of a tree, and a 3D Augmented Reality object (3D AR object 430) of an imaginary character overlaid onto the real-world scene of the elephant and the tree. The example imaginary character may be presented as part of the scene, or may be presented independently of any real objects 410 in the scene. For example, the 3D AR object 430 may be presented relative to the identified areas in the scene so that the character is in the sky, or has feet placed on the ground. The 3D AR object 430 may be adjusted in size and visible portions based on whether the 3D AR object 430 is meant to be in front of or behind various real objects. For example, the character shown in the example 3D AR object 430 may be animated to walk up to the elephant identified as the first real object 410a, and a portion of the 3D AR object 430 may not be generated if the elephant is supposed to be in front of the character (i.e., not displaying the portion of the character that would be obscured by the elephant).

Each of the real objects 410 may be identified in the scene by various sensors in the sensor suite 130, such as an infrared receiver, a camera aimed outside of the vehicle, or a GPS receiver. In a first example, the AR application 121 uses a camera aimed outside of the vehicle 200 (e.g., in the same line of sight as the viewer) to identify various real objects 410 based on visual appearances of those objects. In a second example, a GPS sensor may identify a coordinate set for the ARES 100 and the AR application 121 determines whether that coordinate set corresponds to a location for a permanently placed object, such as a tree, a building, a geographic feature, a statue, or the like. The sensor suite 130 may reference an AR application 121, an image definition library 122, or an external source (e.g., via the radio 150) to identify various real objects 410 and determine which virtual objects (e.g., 2D AR objects 420 or 3D AR objects 430) to display for the viewer.

FIG. 5 illustrates an example of gesture control with an ARES 100. In FIG. 5, a viewer makes a gesture 510 that moves the viewer's right hand from a first position to a second position within the vehicle 200. The viewer is oriented to view a film 235 (or a partially reflective surface 260) through which a scene 520 in the environment outside of the vehicle 200 is visible (including various animals in the illustrated example) and onto which a UI projection 530 is overlaid. In response to the gesture 510, the UI projection 530 is shifted to follow the gesture 510. As illustrated a first UI projection 530a and a second UI projection 530b follow the viewer's right hand so that the first position of the viewer's hand corresponds to the position of the first UI projection 530a in the scene 520 and the second position of the viewer's hand corresponds to the position of the second UI projection 530b in the scene.

To provide gesture control to the viewer, the ARES 100 projects the images that form the UI projection 530 from the projector 170 to the reflector 180 as a first UI reflection 540a and a second UI reflection 540b (generally, UI reflection 540), which in turn reflects from the reflector 180 to the film 235, partially reflective surface 260, or other viewing surface. The UI projections 530 are ghosted images from the UI reflections 540 on the reflector 180 that are overlaid onto the scene 520. The UI projections 530 may be 2D AR objects 420 or 3D AR objects 430 and may be composed of one image or two sub-images of an original image offset from one another to provide a 3D effect to the viewer.

Similarly to how the ARES 100 may track the viewer's eyes to affect a 3D effect in the images, the ARES 100 may identify and track various portions of the viewer's body to provide gesture control. For example, the viewer may raise a hand to provide gesture control that the ARES 100 may identify from a reflected image of the hand (reflected from the viewing surface to the reflector 180 to a camera or other sensors in the sensor suite 130 co-located with the projector 170). In another example, the ARES 100 may identify a hand of the viewer for gesture control via a camera and/or range finder in the sensor suite 130 aimed at the interior cabin of the vehicle 200.

Gesture control provides one example of input that a viewer may provide to the ARES 100. The ARES 100 may accept input for a game (e.g., for the viewer to identify a requested animal, to defend against invaders from space, to guide a character through the scene) to control playback from the ARES 100 (e.g., to control audio volume, projector brightness, select and control a movie or game to play), or to request object identification and information retrieval (e.g., moving a cursor to a real object 410 to request the ARES 100 to identify and provide information on the real object 410). Various gestures in addition to or instead of body tracking may be used in other examples, including, but not limited to: eye tracking, head tracking, selection gestures, zoom gestures, on-screen character navigation, etc. External controllers may also supply input and control to the UI projections 530 and other elements in the scene 520 via the input controller 160 of the ARES 100.

Figure 6:
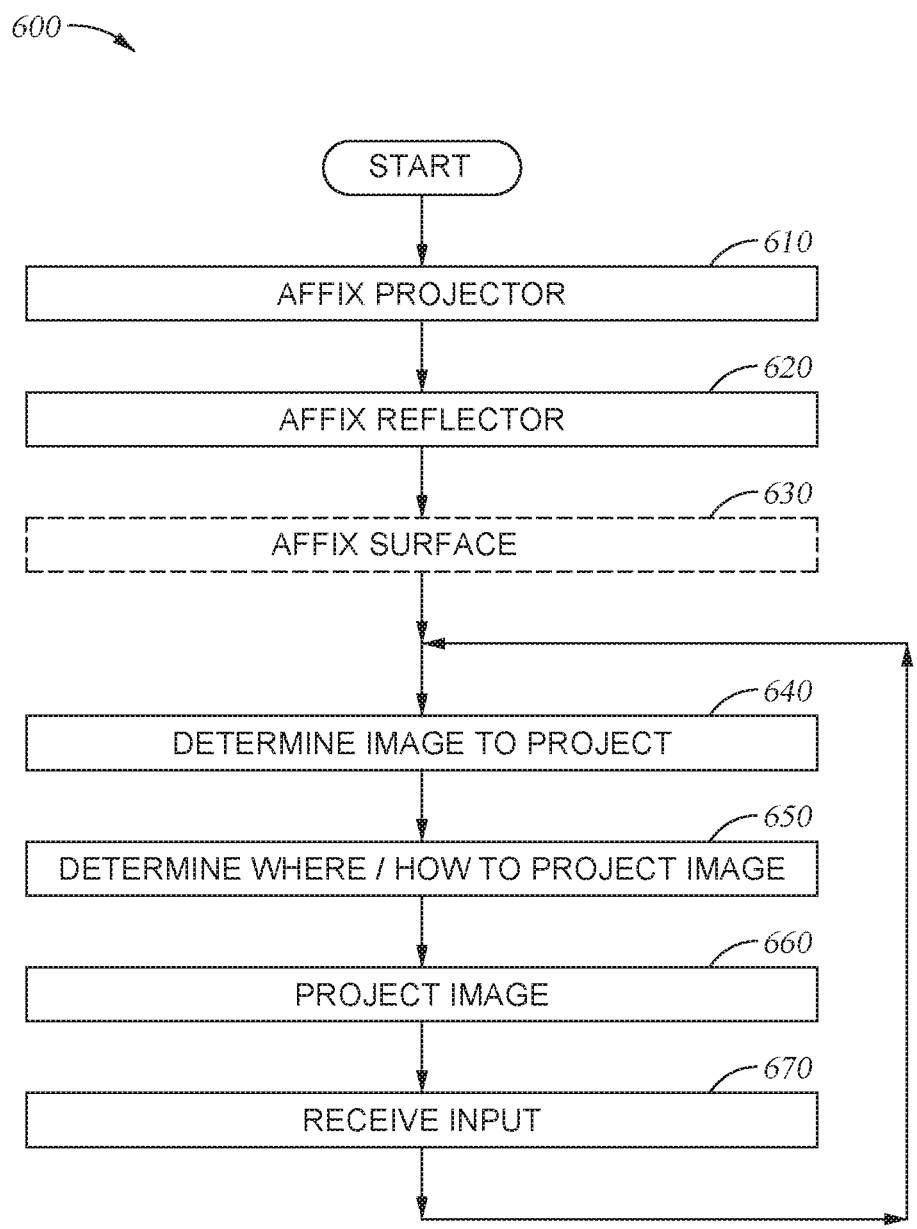
FIG. 6 is a flowchart showing general operations in a method for providing autostereoscopic images for viewing in a vehicle, according to one embodiment described herein.

FIG. 6 is a flowchart showing general operations in a method 600 for providing autostereoscopic images for viewing in a vehicle. Method 600 begins with block 610, where a projector 170 is affixed in a secured position with the cabin of a vehicle 200. In various embodiments, the projector 170 is affixed to an armrest 240 of the vehicle (either part of a chair 210 or a panel 220 of the vehicle 200) by various straps, magnets, suction cups, clamps, etc. or male extensions 171 that are inserted in or through various feature of the armrest 240 (e.g., hand holes, control wells, handles). The projector 170 is installed such that the projector 170 is configured to project inward to the cabin of the vehicle, towards the viewer.

At block 620, a reflector 180 is affixed in the vehicle 200 relative to the projector 170 and a viewing surface, such as a window 230, a film 235 or a partially reflective surface 260 affixed to the window 230 through which the environment external to the vehicle is visible. The window 230, film 235, and/or partially reflective surface 260 may be tinted to block a portion of the light from outside of the vehicle 200 from being seen inside of the vehicle 200, and thus increase the contrast for the ghosted images projected and reflected onto the viewing surface relative to the scene onto which those images are overlaid. The reflector 180 may be adjusted to affect an alignment between the projector 170 and the viewing surface and/or to affect where images projected onto the reflector 180 are reflected onto the viewing surface.

When a film 235 or partially reflective surface 260 is used, the film 235 or partially reflective surface 260 may be temporarily affixed to the window 230 at (optional) block 630. The film 235 or partially reflective surface 260 may be secured to the window 230 by Van der Waals' forces, suction cups, magnets or the like, and may be selectively removed or adjusted without permanently affecting the window 230 or leaving behind a residue. In some embodiments, a lenticular array in the reflector 180, film 235 or partially reflective surface 260 is oriented during installation during block 630 such that each lenticular lens 380 of the array is oriented to provide two separate images; one to the right eye and one to the left eye of the viewer to thereby produce a 3D effect for images projected onto the film 235 or partially reflective surface 260 for a viewer. Each side of the lenticular lens 380 is polarized opposite to the other side of the lenticular lens 380 so that un-polarized light entering the film 235 or partially reflective surface 260 from the environment is passed to both of the viewer's eyes, but an interlaced image (polarized or un-polarized) reflected from the reflector 180 is passed to the viewer's eyes as two separate images; one for each eye.

At block 640, the ARES 100 determines what image to project to the viewer. Depending on the mode of operation for the ARES 100 that the viewer selects, the ARES 100 may determine what image(s) to project based on the location of the vehicle (via a GPS receiver in the sensor suite 130), objects identified in the environment around the vehicle 200 (via camera sensors in the sensor suite 130), viewer input, and/or timing information. For example, the ARES 100 may determine to project images of mountaineers scaling a building in a first mode, but may determine to project images of historical facts in a second mode. Continuing the example, based on viewer input, the ARES 100 may determine to switch between the first mode to the second mode. Further, the ARES 100 may determine to update the images over time, so that the mountaineers are animated as scaling the building or that the facts are removed from display and/or replaced with different facts.

At block 650, the ARES 100 determines how to project the image(s) to the viewer, which includes determining a location on the viewing surface to project/reflect the image(s). In various embodiments, the projector 170 alters where in the field of projection the images are projected from, the polarity of the light used to project the images, and/or an intensity of the light used to project the images. In additional embodiments, the reflector 180 is adjusted relative to the projector 170 and the viewing surface to affect what portion of the reflector 180 receives the projected images and/or where the images are reflected to the viewing surface. The determination of how/where to project the image(s) may be based, in part, on determined viewing distances 320 and viewing angles 330 to the POVs 310 for a viewer, so that each sub-image of a 3D AR object 430 is presented along a different light pathway for each eye of the viewer.

At block 660, the ARES 100 projects the image to the viewer. The projector 170 generates the image(s) and projects the generated image(s) onto the reflector 180, which in turn reflects the image(s) onto the viewing surface to overlay the image(s) onto the scene visible through the viewing surface. When projecting a 3D image, the projector 170 may interlace two sub-images (that are based on an original image, and intended for separate eyes of the viewer) for projection at the same time, or may alternate in time which sub-image of two sub-images is projected at a given time.

At block 670 the ARES 100 receives input for the display of the projected images. The viewer may provide input to the input controller 160 of the ARES 100 via wired or wireless controllers, or via gestures captured via the sensor suite 130. Additionally, the sensor suite 130 may provide input regarding the viewer or the environment, such as when the viewer moves relative to the viewing surface or the environment visible through the viewing surface changes. For example, a camera that provides image recognition of objects in the environment may update the ARES 100 when the objects in the environment move or the vehicle 200 moves through the environment. In another example, a GPS reliever may update the AARES when the vehicle 200 arrives at a new environment with new objects. In a further example, a camera sensor that provides image recognition with the vehicle 200 may update the ARES 100 of the viewer's position relative to the viewing surface.

Method 600 may return to block 640 in response to the input received at block 670 to update the image displayed (per block 640) and/or how the image is projected (per block 650). For example, as the vehicle 200 moves through the environment, the projector 170 and reflector 180 may adjust where the images are projected/reflected onto the viewing surface to keep the images aligned with an associated object. In another example, the images chosen to project/reflect onto the viewing surface may change or update as new objects are identified in the environment. In a further example, the ARES 100 may receive timing input to advance or remove the display of a given image after a given period of time (e.g., fade out and remove a displayed factoid image after s seconds, animate a character image moving from point A to point B over s seconds).

While the foregoing is directed to embodiments of the present invention, other and further embodiments of the invention may be devised without departing from the basic scope thereof, and the scope thereof is determined by the claims that follow.

What is claimed is:

1. A method, comprising:
   determining a first viewing distance and a first viewing angle from a viewing surface defined in a passenger window of a vehicle to a first POV (Point of View) for a viewer, wherein a reflector associated with the passenger window physically interlocks controls for the passenger window;
   determining a second viewing distance and a second viewing angle from the viewing surface to a second POV for the viewer;
   producing a first sub-image for viewing at the first POV based on an image;
   producing a second sub-image for viewing at the second POV based on the image;
   projecting the first sub-image to the reflector, which reflects the first sub-image to a first position on the viewing surface; and
   projecting the second sub-image to the reflector, which reflects the second sub-image to a second position on the viewing surface, wherein the second position is set relative to the first position according to the first viewing distance, the second viewing distance, the first viewing angle, and the second viewing angle.

2. The method of claim 1, further comprising:
   identifying a real object in a scene visible through the viewing surface; and
   positioning the first sub-image and the second sub-image relative to the real object to produce a three-dimensional Augmented Reality object on the viewing surface in relation to the real object.

3. The method of claim 1, wherein the first viewing distance and the first viewing angle are determined based on a reflection including a first image of a first eye of the viewer in the viewing surface that is reflected via the reflector to a camera sensor; and
   wherein the second viewing distance and the second viewing angle are determined based on the reflection including a second image of a second eye of the viewer in the viewing surface that is reflected via the reflector to the camera sensor.

4. The method of claim 1, wherein the first sub-image is projected via light of a first polarity and the second sub-image is projected via light of a second polarity.

5. The method of claim 1, wherein the first sub-image and the second sub-image are projected simultaneously in an interposed image.

6. The method of claim 1, wherein the viewing surface is a lenticular array configured to receive the first sub-image from the reflector and reflect the first sub-image via a first split light pathway to the first POV and receive the second sub-image from the reflector and reflect the second sub-image via a second split light pathway to the second POV.

7. A method, comprising:
   providing a projector in a cabin of a vehicle, aligned to project an image inward to the cabin of the vehicle, wherein the projector, when affixed, physically interlocks controls for a side window that are located where the projector is provided:
   providing a reflector in the cabin of the vehicle relative to the projector to reflect the image outward from the cabin of the vehicle onto the side window of the vehicle;
   determining distances and angles from the side window of the vehicle to eyes of a viewer in the cabin of the vehicle; and
   projecting the image from the projector to the reflector to the side window to the viewer based on the distances and the angles.

8. The method of claim 7, further comprising:
   affixing a film to the side window of the vehicle as a viewing surface for the image, wherein a scene from outside of the vehicle is visible through the film.

9. The method of claim 8, wherein:
   the film includes a lenticular array configured to project a first sub-image to a first eye of the eyes of the viewer and a second sub-image to a second eye of the eyes of the viewer to display the image as a three-dimensional Augmented Reality object overlaid onto the scene.

10. The method of claim 7, further comprising:
    in response to receiving an input, updating a position of the image on the side window.

11. The method of claim 10, wherein
    the input is received from a camera sensor in response to the eyes of the viewer moving within the cabin of the vehicle from a first location to a second location, and wherein updating the position of the image maintains a relative position of the image on the side window for the viewer in the second location relative to the first location.

12. The method of claim 10, wherein
    the input is received from a camera sensor in response to a hand gesture command from the viewer moving within the cabin of the vehicle, and wherein updating the position of the image affects the image in response to the hand gesture command.

13. The method of claim 10, wherein
    the input is received from at least one of a camera sensor focused on an environment visible through the side window and a Global Positioning System receiver identifying a location of the vehicle, wherein updating the position of the image affects where the image is displayed in relation to real objects in the environment.

14. The method of claim 7, wherein determining distances and the angles from the side window of the vehicle to the eyes of a viewer in the cabin of the vehicle further comprises:
    identifying the eyes of the viewer from a reflected image from the side window to the reflector to a camera sensor aligned with the reflector;
    determining the distances based on a size of the eyes and an orientation of the eyes;
    determining an intra-eye distance based on the size of the eyes and the orientation of the eyes; and
    determining the angles from the side window based on the distances and the intra-eye distance.

15. A system, comprising:
    a projector mounted in a vehicle;
    a reflector positioned to receive an image from the projector and reflect the image onto a viewing surface defined in a side window defined in a door of the vehicle through which a scene external to the vehicle is visible, wherein the reflector interlocks the side window that the reflector is associated with to prevent the side window from opening while the system is installed;

a processor; and a memory, including instructions that when executed by the processor enable the system to:

determine a first viewing distance and a first viewing angle from the viewing surface to a first POV for a viewer;

determine a second viewing distance and a second viewing angle from the viewing surface to a second POV for the viewer;

produce a first sub-image for viewing at the first POV based on an image;

produce a second sub-image for viewing at the second POV based on the image;

project the first sub-image from the projector to the reflector to reflect the first sub-image to a first position on the viewing surface; and project the second sub-image from the projector to the reflector to reflect the second sub-image to a second position on the viewing surface, wherein the second position is set relative to the first position according to the first viewing distance, the second viewing distance, the first viewing angle, and the second viewing angle.

16. The system of claim 15, further comprising:

a film, defining a designated viewing area of the viewing surface positioned on the viewing surface to receive the first sub-image and the second sub-image, wherein the film includes a lenticular array.

17. The system of claim 16, wherein the lenticular array receives the first sub-image in a first polarity of light to reflect from the film at the first viewing angle and receives the second sub-image in a second polarity of light to reflect from the film at the second viewing angle.

18. The system of claim 15, further comprising:

a camera, positioned relative to the viewing surface to observe the external scene;

wherein the camera is further configured to identify a real object in the scene visible through the viewing surface; and position the first sub-image and the second sub-image relative to the real object to produce a three-dimensional Augmented Reality object on the viewing surface in relation to the real object.

19. The system of claim 15, further comprising:

a second camera, positioned relative to the reflector and the viewing surface to determine the first viewing distance, the first viewing angle, the second viewing distance, and the second viewing angle.

20. The system of claim 15, wherein the reflector enables the system to physically interlock controls for the side window and prevent the side window from opening while the system is installed.

* * * * *

UNITED STATES PATENT AND TRADEMARK OFFICE
CERTIFICATE OF CORRECTION

Page 1 of 1

PATENT NO. : 11,054,656 B2
APPLICATION NO. : 16/043606
DATED : July 6, 2021
INVENTOR(S) : Eric C. Haseltine et al.

It is certified that error appears in the above-identified patent and that said Letters Patent is hereby corrected as shown below:

In the Specification

In Column 9, Line 16, after "260" insert -- for --.

In Column 14, Line 48, delete "AARES" and insert -- ARES --, therefor.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*